United States Patent
Sun et al.

(10) Patent No.: US 12,224,663 B2
(45) Date of Patent: Feb. 11, 2025

(54) SWITCHED CAPACITOR CONVERTER

(71) Applicant: Silergy Semiconductor Technology (Hangzhou) LTD, Hangzhou (CN)

(72) Inventors: Junyan Sun, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 303 days.

(21) Appl. No.: 17/725,791

(22) Filed: Apr. 21, 2022

(65) Prior Publication Data

US 2022/0376619 A1    Nov. 24, 2022

(30) Foreign Application Priority Data

May 19, 2021    (CN) .......................... 202110548296.0

(51) Int. Cl.
*H02M 3/07*    (2006.01)
*H02M 3/158*    (2006.01)

(52) U.S. Cl.
CPC ........... *H02M 3/07* (2013.01); *H02M 3/1584* (2013.01)

(58) Field of Classification Search
CPC ...................... H02M 3/07–078; H02M 1/0095
See application file for complete search history.

(56) References Cited

U.S. PATENT DOCUMENTS

| | | | |
|---|---|---|---|
| 8,581,518 B2 | 11/2013 | Kuang et al. | |
| 2011/0127925 A1 | 6/2011 | Huang et al. | |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0212795 A1 | 7/2020 | Das et al. | |
| 2022/0029540 A1 | 1/2022 | Zhang et al. | |
| 2022/0231600 A1* | 7/2022 | Jong | H02M 3/07 |

FOREIGN PATENT DOCUMENTS

| | | |
|---|---|---|
| CN | 107346940 A | 11/2017 |
| CN | 108566092 B | 9/2018 |

OTHER PUBLICATIONS

First Office Action, translated, SIPO, Jul. 3, 2024.

* cited by examiner

*Primary Examiner* — Peter M Novak

(57) ABSTRACT

A switched capacitor converter can include a plurality of input switch groups connected in series between an input terminal and an output terminal, where each input switch group can include two power switches connected in series. The switched capacitor converter can also include a plurality of output switch groups, where each output switch group can include two power switches connected in series. The switched capacitor converter can also include a plurality of capacitors, first terminals of which are respectively connected to the common nodes of every two series-connected power switches in the plurality of input switch groups, and second terminals of which are respectively connected to intermediate nodes of each output switch group. The switched capacitor converter can also include a plurality of inductors, where a first terminal of each output switch group can connect to a first terminal of a corresponding inductor.

17 Claims, 12 Drawing Sheets

(a)

(b)

US 12,224,663 B2

SWITCHED CAPACITOR CONVERTER

RELATED APPLICATIONS

This application claims the benefit of Chinese Patent Application No. 202110548296.0, filed on May 19, 2021, which is incorporated herein by reference in its entirety.

FIELD OF THE INVENTION

The present invention generally relates to the field of power electronics, and more particularly to switched capacitor converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
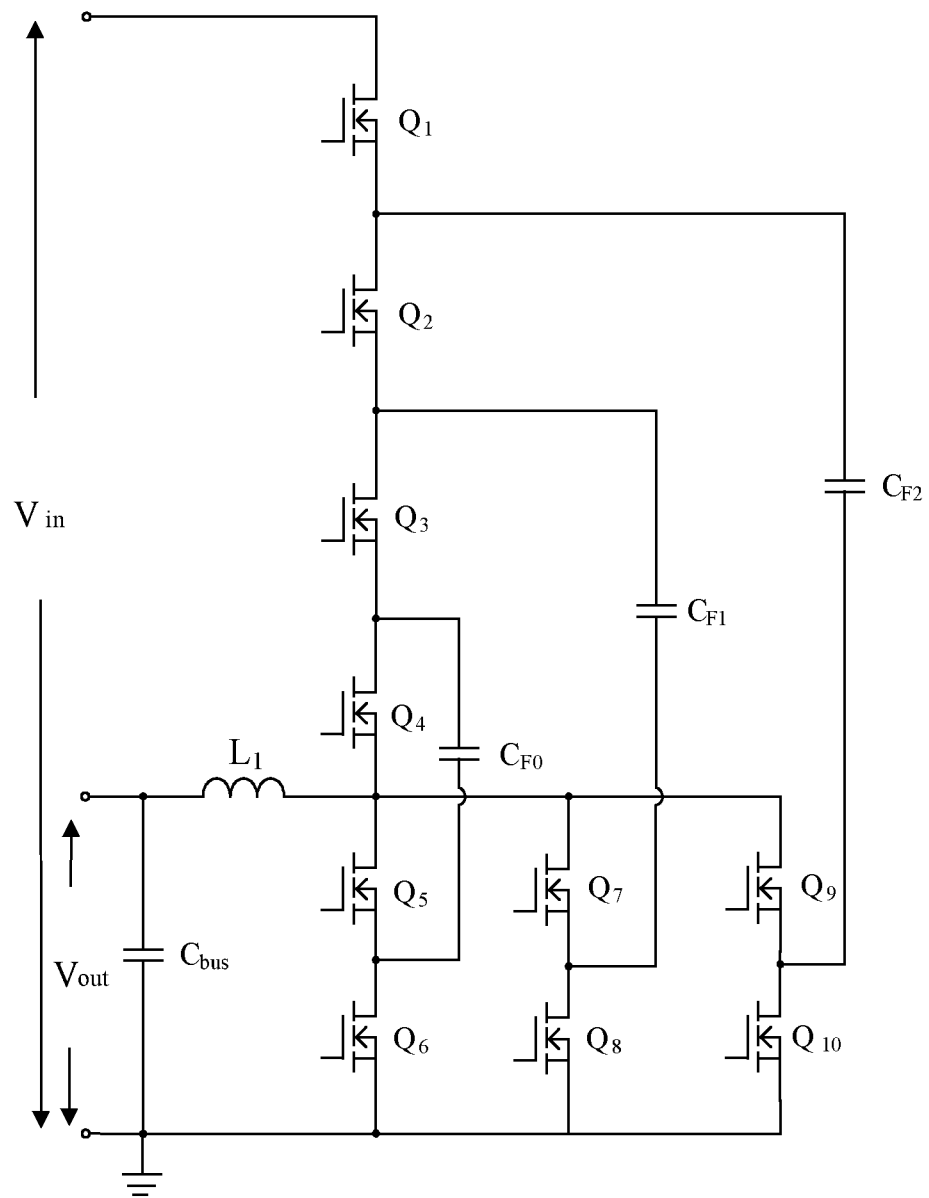
FIG. 1 is a schematic circuit diagram of an example Dickson switched capacitor converter.

Referring now to FIG. 1, shown is a schematic circuit diagram of an example Dickson switched capacitor converter, and its voltage conversion ratio is 4:1. In this particular example, under the original control mode with 50% complementary duty cycle in two branches, since the capacitive reactance decreases after the capacitors are connected in series, the charging rate of the capacitor voltage is different. Also, there is a state of parallel operation of the capacitors in the system when the power switches are turned on or off, thereby resulting in the peak current. Therefore, a more complex control approach may be needed so that there is no voltage difference in the capacitor loop during the switching action, in order to reduce the current spike and improve the operation efficiency of the system. In particular embodiments, a switched capacitor converter is provided in order to reduce current spikes and improve operation efficiency of the system.

In particular embodiments, a switched capacitor converter can include a plurality of input switch groups connected in series between an input terminal and an output terminal, where each input switch group can include two power switches connected in series. The switched capacitor converter can also include a plurality of output switch groups, where each output switch group can include two power switches connected in series. The switched capacitor converter can also include a plurality of capacitors, first terminals of which are respectively connected to the common nodes of every two series-connected power switches in the plurality of input switch groups, and second terminals of which are respectively connected to intermediate nodes of each output switch group. The switched capacitor converter can also include a plurality of inductors, where a first terminal of each output switch group can connect to a first terminal of a corresponding inductor, and second terminals of the plurality of inductors are connected to the output terminal, and second terminals of the plurality of output switch groups are connected to the reference ground.

Figure 2:
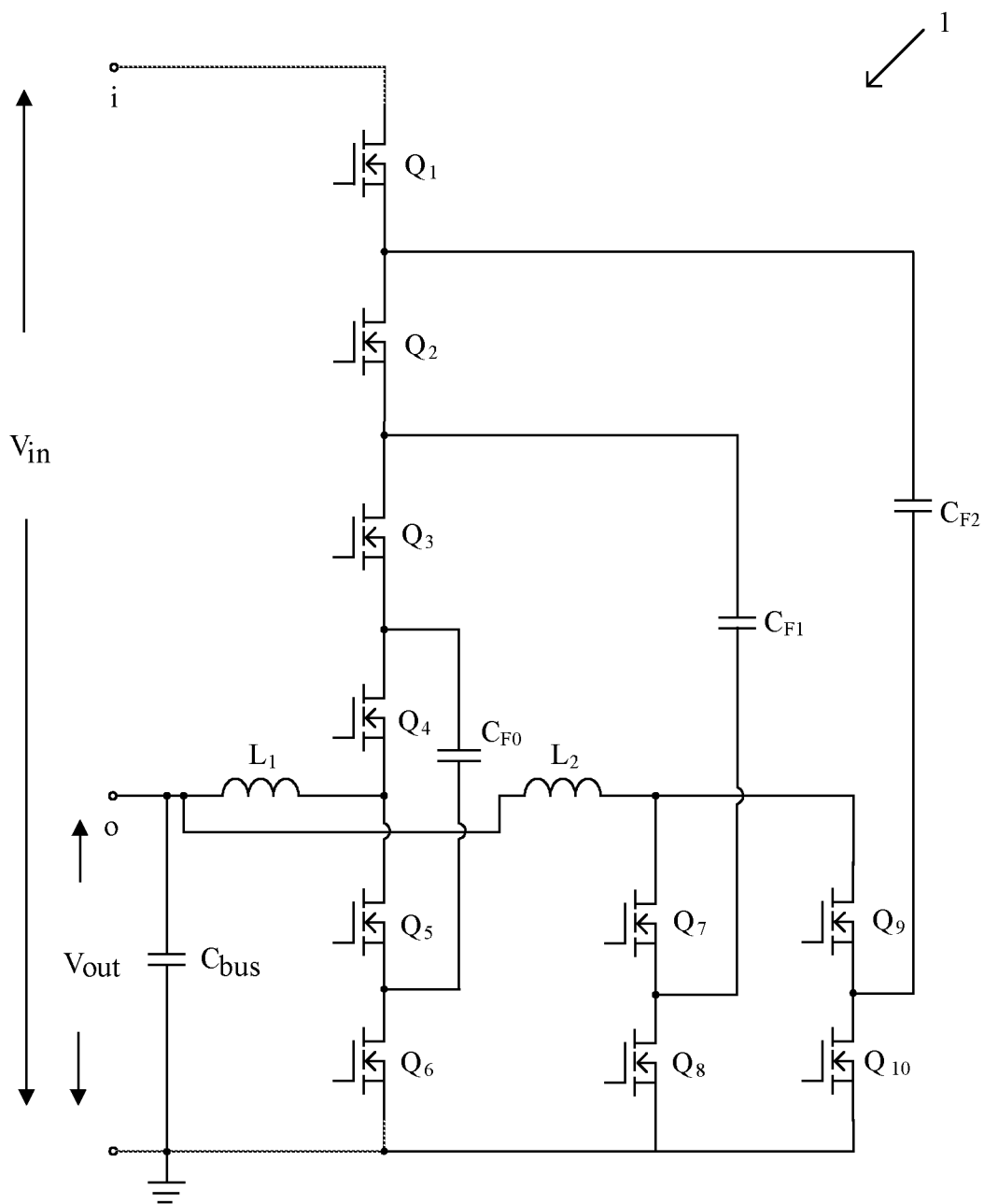
FIG. 2 is a schematic circuit diagram of a first example switched capacitor converter, in accordance with embodiments of the present invention.

Referring now to FIG. 2, shown is a schematic circuit diagram of a first example switched capacitor converter, in accordance with embodiments of the present invention. In this example, switched capacitor converter 1 can include two input switch groups, three output switch groups, three capacitors, and two inductors. A first input switch group and a second input switch group can connect in series between input terminal i and output terminal o. The first input switch group can include two power switches $Q_1$ and $Q_2$ connected in series. The second input switch group can include two power switches $Q_3$ and $Q_4$ connected in series. A first output switch group can include two power switches $Q_5$ and $Q_6$ connected in series. A second output switch group can include two power switches $Q_7$ and $Q_8$ connected in series. A third output switch group can include power switches $Q_9$ and $Q_{10}$ connected in series.

A first terminal of first capacitor $C_{F0}$ can connect to the common node of power switches $Q_3$ and $Q_4$. A second terminal of capacitor $C_{F0}$ can connect to an intermediate node of the first output switch group (e.g., the common node of power switches $Q_5$ and $Q_6$). A first terminal of capacitor $C_{F1}$ can connect to the common node of power switches $Q_2$ and $Q_3$, and a second terminal of capacitor $C_{F1}$ can connect to an intermediate node of the second output switch group (e.g., the common node of power switches $Q_7$ and $Q_8$). A first terminal of capacitor $C_{F2}$ can connect to the common node of power switches $Q_1$ and $Q_2$, and a second terminal of capacitor $C_{F2}$ can connect to an intermediate node of the third output switch group (e.g., the common node of power switches $Q_9$ and $Q_{10}$). A first terminal of inductor $L_1$ can connect to a first terminal of the first output switch group, and a second terminal of inductor $L_1$ can connect to output terminal o. A first terminal of inductor $L_2$ can connect to first terminals of the second and third output switch groups, and a second terminal of inductor $L_2$ can connect to output terminal o. In addition, the second terminals of the first, second, and third output switch groups can all connect to the reference ground.

In particular embodiments, the power switches in the input switch groups and the output switch groups can be controlled to perform switching operations, such that the switched capacitor converter operates in different working stages. Also, each of capacitor branches formed in each working stage where capacitor $C_{F0}$, capacitor $C_{F1}$, and capacitor $C_{F2}$ can include inductor $L_1$ or inductor $L_2$, thereby reducing the peak current when the switched capacitor converter switches between the working stages.

Figure 3:
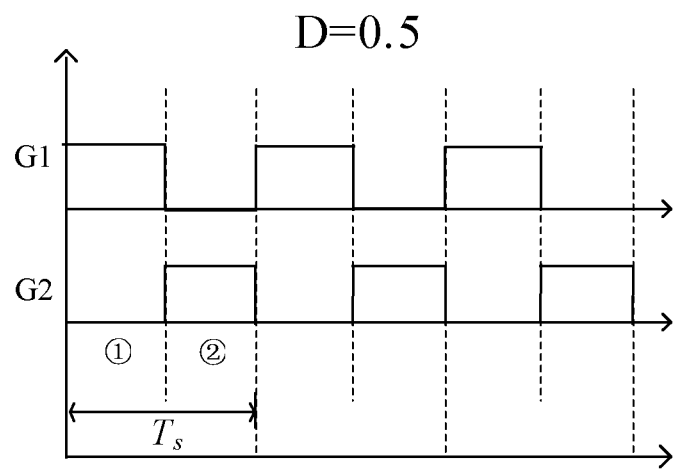
FIG. 3 is a timing diagram of example control signals for the first example switched capacitor converter, in accordance with embodiments of the present invention.

Referring now to FIG. 3, shown is a timing diagram of example control signals for the first example switched capacitor converter, in accordance with embodiments of the present invention. In this particular example, the switching states of each input switch group are the same, the switching state of the first output switch group is the same as that of each input switch group, and the switching states of two adjacent output switch groups are opposite. In addition, in the two output switch groups connected to inductor $L_2$, the switching state of the third output switch group is the same as that of each input switch group, and the switching state of the second output switch group is opposite to that of each input switch group. One of the two power switches in each input and output switch group in the switched capacitor converter can be turned on and off according to a first control signal, and the other one of the two power switches in each input and output switch group may be turned on and off according to a second control signal. The first and second control signals may have the same duty cycle and not overlap each other. In this example, in one switching cycle, the first and second control signals are complementary and have a duty ratio of 50%.

In one switching cycle, when the first control signal is active, the switched capacitor converter operates in a first stage. When the second control signal is active, the switched capacitor converter operates in a second stage. For example, power switches $Q_1$, $Q_3$, $Q_5$, $Q_8$ and $Q_9$ can be turned on and off synchronously according to control signal G1, and power switches $Q_2$, $Q_4$, $Q_6$, $Q_7$, and $Q_{10}$ may be turned on and off synchronously according to second control signal G2. When control signal G1 is active (e.g., when control signal G1 is at a high level), power switches $Q_1$, $Q_3$, $Q_5$, $Q_8$, and $Q_9$ can be turned on, and then the switched capacitor converter operates in the first stage. When control signal G2 is active (e.g., when control signal G2 is at a high level, power switches $Q_2$, $Q_4$, $Q_6$, $Q_7$ and $Q_{10}$ can be turned on, and then the switching converter operates in the second stage. In particular embodiments, the ratio of input voltage Vin to output voltage Vout of the switched capacitor converter can be 4:1 under the above-mentioned control method.

Figure 4:
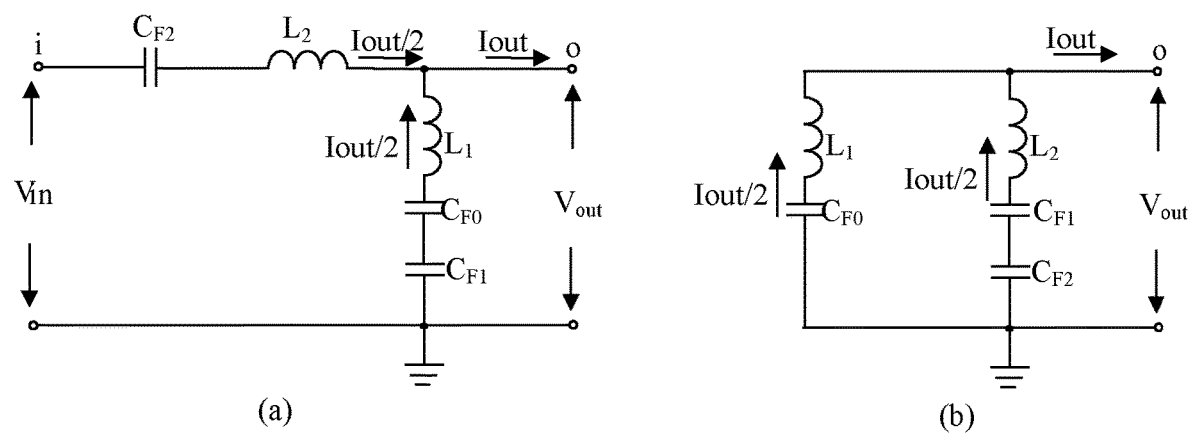
FIG. 4 is an equivalent circuit diagram of the first example switched capacitor converter, in accordance with embodiments of the present invention.

Referring now to FIG. 4, shown is an equivalent circuit diagram of the first example switched capacitor converter, in accordance with embodiments of the present invention. Diagram (a) in FIG. 4 shows an equivalent circuit diagram of the first example switched capacitor converter in the first stage. In the first stage, two capacitor branches can be formed, the first capacitor branch can connect between output terminal o and the reference ground, and the second capacitor branch can connect between input terminal i and output terminal o. The first capacitor branch can include capacitor $C_{F0}$, capacitor $C_{F1}$, and inductor $L_1$ connected in series. The second capacitor branch can include capacitor $C_{F2}$ and inductor $L_2$ connected in series. In the first stage, input voltage Vin may supply power to the load through capacitor $C_{F2}$ and inductor $L_2$ in the second capacitor branch, while capacitor $C_{F1}$ in the first capacitor branch may supply power to the load through capacitor $C_{F0}$ and inductor $L_1$.

Diagram (b) in FIG. 4 shows an equivalent circuit diagram of the first example switched capacitor converter in the second stage. In the second stage, two capacitor branches can be formed, and the first and second capacitor branches can connect in parallel between output terminal o and the reference ground. The first capacitor branch can include inductor $L_1$ and capacitor $C_{F0}$ connected in series. The second capacitor branch can include inductor $L_2$ and capacitors $C_{F1}$ and $C_{F2}$ connected in series. In the second stage, capacitor $C_{F2}$ in the second capacitor branch may supply power to the load through capacitor $C_{F1}$ and inductor $L_2$. In addition, capacitor $C_{F0}$ in the first capacitor branch can supply power to the load through first inductor $L_1$.

In particular embodiments, when the switched capacitor converter operates in the first stage or the second stage, each capacitor branch formed in each stage can include an inductor, in order to reduce the current spike when the switched capacitor converter performs switching operations, thereby improving system efficiency.

In particular embodiments, the switched capacitor converter operates in a quasi-resonant state or a resonant state according to different inductances of the inductors. Further, the inductance of inductor $L_1$ and the inductance of inductor $L_2$ can be the same. Also, the capacitance of capacitor $C_{F1}$ connected to the common node of the adjacent input switch groups (here, the first and second input switch groups) can be much larger than the capacitances of capacitors $C_{F0}$ and $C_{F2}$ connected to the intermediate node of each input switch group, while the capacitances of capacitors $C_{F0}$ and $C_{F2}$ are equal. Therefore, in the first stage, the capacitance of series-connection of capacitors $C_{F1}$ and $C_{F0}$ can essentially be basically the same as that of capacitor $C_{F2}$. In the second stage, the capacitance of series-connection of capacitors $C_{F1}$ and $C_{F2}$ in series may essentially be the same as that of capacitor $C_{F0}$. Therefore, in the first stage or the second stage, the capacitance and inductance of different capacitor branches can essentially be the same, such that the resonance center frequency remains unchanged in different working stages. Accordingly, in the first stage and the second stage, inductors $L_1$ and $L_2$ can be in the same equivalent operation state, and each inductor may bear a current with an average value of Iout/2, where Iout is the output current of the switched capacitor converter.

Figure 5A:
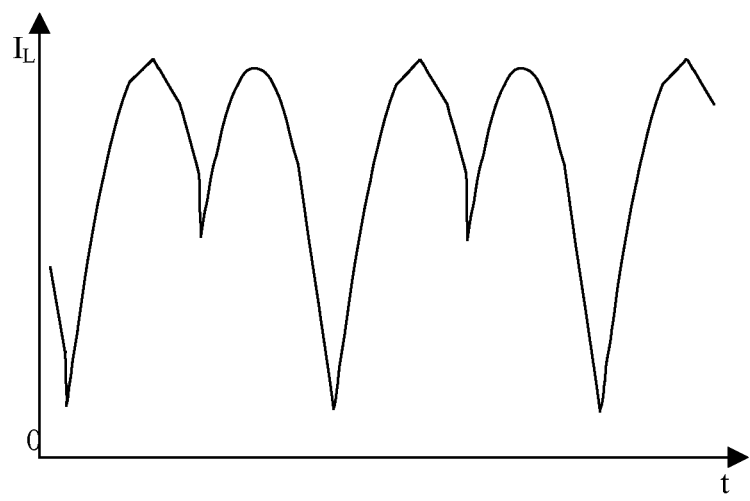
FIG. 5A is a waveform diagram of inductor current when the switched capacitor converter operates in a quasi-resonant state, in accordance with embodiments of the present invention.

Referring now to FIG. 5A, shown is a waveform diagram of inductor current when the switched capacitor converter operates in a quasi-resonant state, in accordance with embodiments of the present invention. The ordinate of the waveform shown in FIG. 5A is inductor current $I_L$, and the abscissa is time t. In this particular example, each inductor current is the same, and one inductor current is used. When the circuit operates in the quasi-resonant state, the ripple of the inductor current is relatively small, which can reduce the AC loss of the inductor. However, the inductance of the inductor can be slightly larger, thereby resulting in certain switching losses.

Figure 5B:
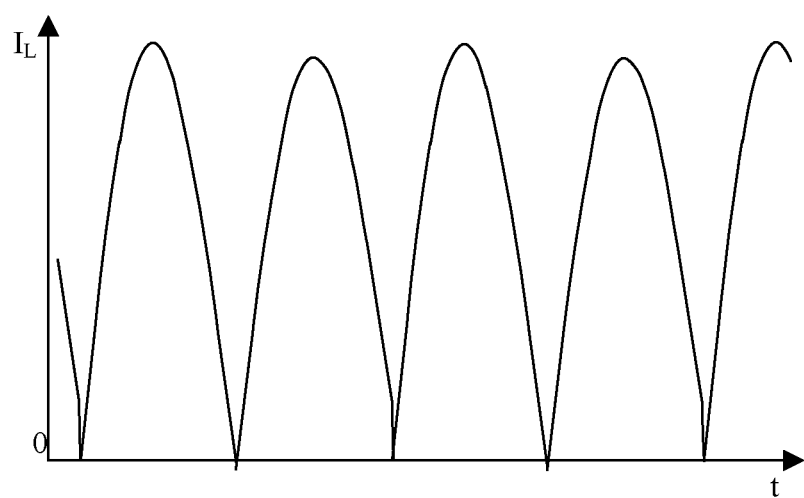
FIG. 5B is a waveform diagram of inductor current when the switched capacitor converter operates in a resonant state, in accordance with embodiments of the present invention.

Referring now to FIG. 5B, shown is a waveform diagram of inductor current when the switched capacitor converter operates in a resonant state, in accordance with embodiments of the present invention. The ordinate of the waveform diagram shown in FIG. 5B is inductor current $I_L$, and the abscissa is time t. In this particular example, each inductor current is the same, and one inductor current is used. When the circuit operates in the resonant state, the inductance of the inductor is relatively small and the power switches may operate in the zero-current-switching (ZCS) state, and thus the switching loss is reduced. However, the ripple of the inductor current is relatively large, which can bring a correspondingly large AC loss of the inductor. The two operation states both have advantages and disadvantages, and they are both typical recommended operation conditions, so the specific operation state should be decided according to the situation. For example, when the requirement for efficiency is higher than the requirement for power density, the system may operate in the quasi-resonant state, and when the requirements for efficiency is lower than the requirement for power density, the system may operate in the resonant state.

Figure 6:
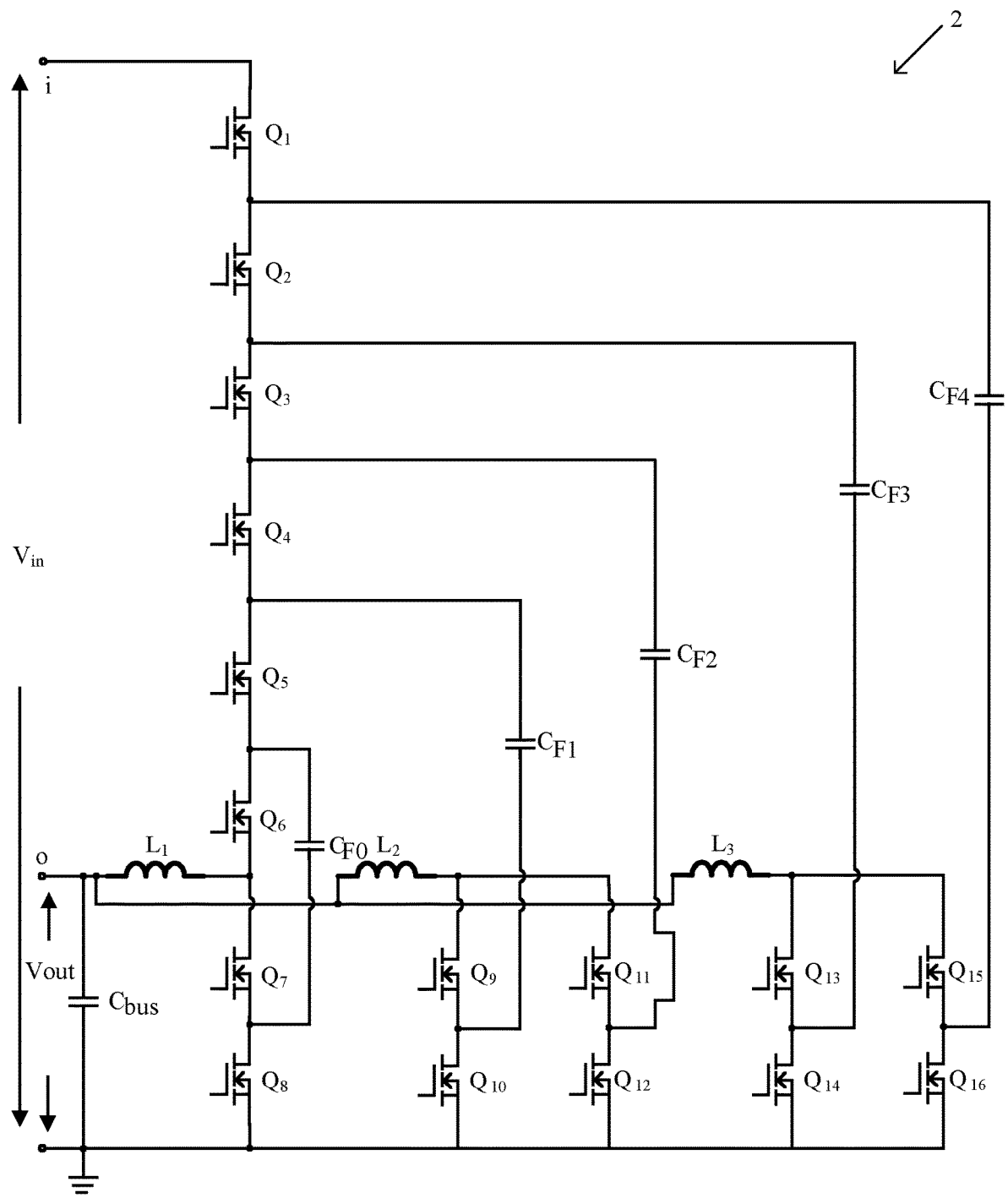
FIG. 6 is a schematic circuit diagram of a second example switched capacitor converter, in accordance with embodiments of the present invention.

Referring now to FIG. 6, shown is schematic circuit diagram of a second example switched capacitor converter, in accordance with embodiments of the present invention. In this particular example, the switched capacitor converter with three input switch groups is shown. Switched capacitor converter 2 can include three input switch groups, five output switch groups, five capacitors, and three inductors. For example, a first input switch group, a second input switch group, and a third input switch group can connect in series between input terminal i and output terminal o. The first input switch group can include two power switches $Q_1$ and $Q_2$ connected in series, the second input switch group can include two power switches $Q_3$ and $Q_4$ connected in series, and the third input switch group can include two power switches $Q_5$ and $Q_6$ connected in series. A first output switch group can be directly connected in series with the third input switch group. For example, the first output switch group can include two power switches $Q_7$ and $Q_8$ connected in series, a second output switch group can include two power switches $Q_9$ and $Q_{10}$ connected in series, a third output switch group can include two power switches $Q_{11}$ and $Q_{12}$ connected in series, a fourth output switch group can include two power switches $Q_{13}$ and $Q_{14}$ connected in series, and a fifth output switch group can include two power switches $Q_{15}$ and $Q_{16}$ connected in series.

A first terminal of capacitor $C_{F0}$ can connect to the common node of power switches $Q_5$ and $Q_6$, and a second terminal of first capacitor $C_{F0}$ can connect to the intermediate node of the first output switch group (e.g., the common node of power switches $Q_7$ and $Q_8$). A first terminal of the capacitor $C_{F1}$ can connect to the common node of power switches $Q_4$ and $Q_5$, and a second terminal of the capacitor $C_{F1}$ can connect to the intermediate node of the second output switch group (e.g., the common node of power switches $Q_9$ and $Q_{10}$). A first terminal of capacitor $C_{F2}$ can connect to the common node of power switches $Q_3$ and $Q_4$, and a second terminal of capacitor $C_{F2}$ can connect to the intermediate node of the third output switch group (e.g., the common node of power switches $Q_{11}$ and $Q_{12}$). A first terminal of capacitor $C_{F3}$ can connect to the common node of power switches $Q_2$ and $Q_3$, and a second terminal of capacitor $C_{F3}$ can connect to the intermediate node of the fourth output switch group (e.g., the common node of power switches $Q_{13}$ and $Q_{14}$). A first terminal of capacitor $C_{F4}$ can connect to the common node of power switches $Q_1$ and $Q_2$, and a second terminal of capacitor $C_{F4}$ can connect to the intermediate node of the fifth output switch group (e.g., the common node of power switches $Q_{15}$ and $Q_{16}$). A first terminal of inductor $L_1$ can connect to a first terminal of the first output switch group, and a second terminal of inductor $L_1$ can connect to output terminal o. A first terminal of inductor $L_2$ can connect to first terminals of the second output switch group and the third output switch group at the same time, and a second terminal of inductor $L_2$ can connect to output terminal o. A first terminal of inductor $L_3$ can connect to first terminals of the fourth switch group and the fifth switch group at the same time, and a second terminal of third inductor $L_3$ can connect to output terminal o. In addition, the second terminal of each output switch group can connect to the reference ground.

In particular embodiments, the power switches in the input switch groups and the output switch groups can be controlled to be turned on and off, such that the switched capacitor converter operates in different working stages, and each of the capacitor branches where capacitors $C_{F0}$, $C_{F1}$, $C_{F2}$, $C_{F3}$, and $C_{F4}$ are located can include an inductor, thereby reducing the peak current when the switched capacitor converter switches between the working stages.

Figure 7:
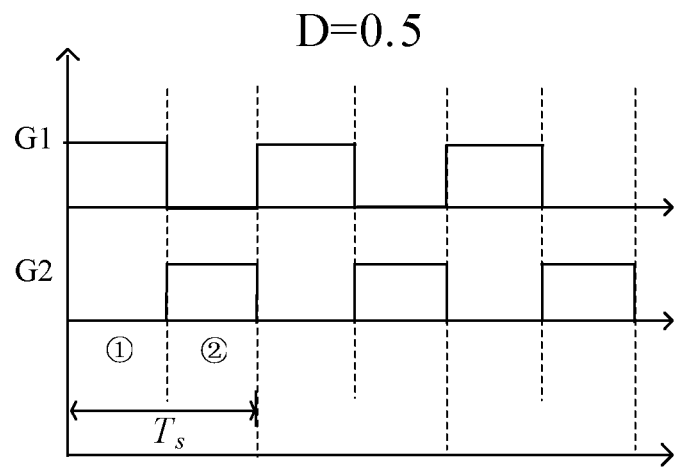
FIG. 7 is a timing diagram of example control signals for the second example switched capacitor converter, in accordance with embodiments of the present invention.

Referring now to FIG. 7, shown is timing diagram of example control signals for the second example switched capacitor converter, in accordance with embodiments of the present invention. In this particular example, the switching states of each input switch group are the same, the switching state of the first output switch group is the same as that of each input switch group, and the switching states of two adjacent output switch groups are opposite. In this particular example, the switching states of the first, third, and fifth output switch groups are the same as that of each input switch group, and the switching states of the second and fourth output switch groups are opposite to that of each input switch group. One of the two power switches in each input and output switch group in the switched capacitor converter can be turned on and off according to control signal G1, and the other one of the two power switches in each input and output switch group can be turned on and off according to control signal G2. Control signals G1 and G2 may have the same duty cycle and not overlap each other. In this example, in one switching cycle, control signals G1 and G2 are complementary and have a duty ratio of 50%.

In one switching cycle, when control signal G1 is active, the switched capacitor converter operates in a first stage. When control signal G2 is active, the switched capacitor converter operates in a second stage. For example, power switches $Q_1$, $Q_3$, $Q_5$, $Q_7$, $Q_{10}$, $Q_{11}$, $Q_{14}$, and $Q_{15}$ can be turned on and off synchronously according to control signal G1, and power switches $Q_2$, $Q_4$, $Q_6$, $Q_8$, $Q_9$, $Q_{12}$, $Q_{13}$, and $Q_{16}$ may be turned on and off synchronously according to control signal G2. When control signal G1 is active (e.g., when control signal G1 is at a high level), power switches $Q_1$, $Q_3$, $Q_5$, $Q_7$, $Q_{10}$, $Q_{11}$, $Q_{14}$, and $Q_{15}$ can be turned on, and then the switched capacitor converter operates in the first stage. When control signal G2 is active (e.g., when control signal G2 is at a high level), power switches $Q_2$, $Q_4$, $Q_6$, $Q_8$, $Q_9$, $Q_{12}$, $Q_{13}$, and $Q_{16}$ can be turned on, and then the switching converter operates in the second stage. In particular embodiments, the ratio of input voltage Vin to output voltage Vout of the switched capacitor converter can be 6:1 under the above-mentioned control method.

Figure 8:
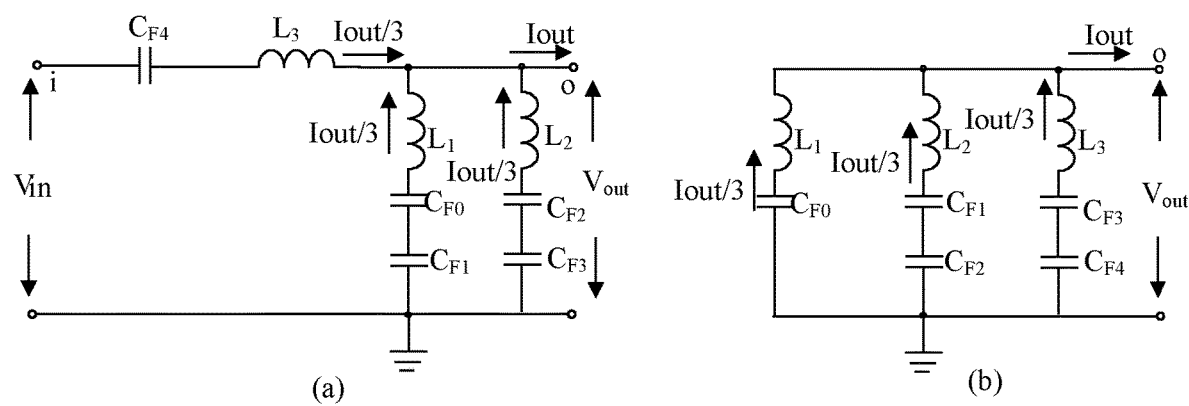
FIG. 8 is an equivalent circuit diagram of the second example switched capacitor converter, in accordance with embodiments of the present invention.

Referring now to FIG. 8, shown is an equivalent circuit diagram of the second example switched capacitor converter, in accordance with embodiments of the present invention. Diagram (a) of FIG. 8 shows an equivalent circuit diagram of the second example switched capacitor converter in the first stage. In the first stage, three capacitor branches may be formed, the first and second capacitor branches can connect in parallel between output terminal o and the reference ground, and the third capacitor branch can connect between input terminal i and output terminal o. For example, the first capacitor branch can include capacitor $C_{F0}$, capacitor $C_{F1}$, and inductor $L_1$ connected in series. The second capacitor branch can include capacitor $C_{F2}$, capacitor $C_{F3}$, and inductor $L_2$ connected in series. The third capacitor branch can include capacitor $C_{F4}$ and inductor $L_3$ connected in series. In the first stage, input voltage Vin may supply power to the load through capacitor $C_{F4}$ and inductor $L_3$ in the third capacitor branch, while capacitor $C_{F1}$ in the first capacitor branch may supply power to the load through capacitor $C_{F0}$ and inductor $L_1$, and capacitor $C_{F3}$ may supply power to the load through capacitor $C_{F2}$ and inductor $L_2$.

Diagram (b) of FIG. 8 shows an equivalent circuit diagram of the second example switched capacitor converter under the second stage. In the second stage, three capacitor branches can be formed, and the first to third capacitor branches can connect in parallel between output terminal o and the reference ground. The first capacitor branch can include inductor $L_1$ and capacitor $C_{F0}$ connected in series. The second capacitor branch can include inductor $L_2$, capacitor $C_{F1}$, and capacitor $C_{F2}$ connected in series. The third capacitor branch can include inductor $L_3$, capacitor $C_{F3}$, and capacitor $C_{F4}$ connected in series. In the second stage, capacitor $C_{F0}$ in the first capacitor branch may supply power to the load through inductor $L_1$. Capacitor $C_{F2}$ in the second capacitor branch may supply power to the load through capacitor $C_{F1}$ and inductor $L_2$. Capacitor $C_{F4}$ in the third capacitor branch may supply power to the load through capacitor $C_{F3}$ and inductor $L_3$.

In particular embodiments, when the switched capacitor converter operates in the first stage or the second stage, each capacitor branch formed in each stage can include an inductor, in order to reduce the current spike when the switched capacitor converter performs switching operations, thereby improving system efficiency.

In particular embodiments, the switched capacitor converter operates in a quasi-resonant state or a resonant state according to different inductances of the inductors. Further, the inductances of inductors $L_1$, $L_2$, and $L_3$ can be the same, and the capacitances of the capacitors connected to the common nodes of the adjacent input switch groups may be much larger than the capacitances of the capacitors connected to the intermediate node of each input switch group. For example, the capacitances of capacitors $C_{F1}$ and $C_{F3}$ can be much greater than the capacitances of capacitors $C_{F0}$, $C_{F2}$, and $C_{F4}$. Also, the capacitances of capacitors $C_{F0}$, $C_{F2}$, and $C_{F4}$ may be equal. Therefore, the resonance center frequency remains unchanged in different working stages. Accordingly, in the first stage and the second stage, inductors $L_1$, $L_2$, and $L_3$ can be in the same equivalent operation state, and each inductor may bear a current with an average value of Iout/3.

Figure 9:
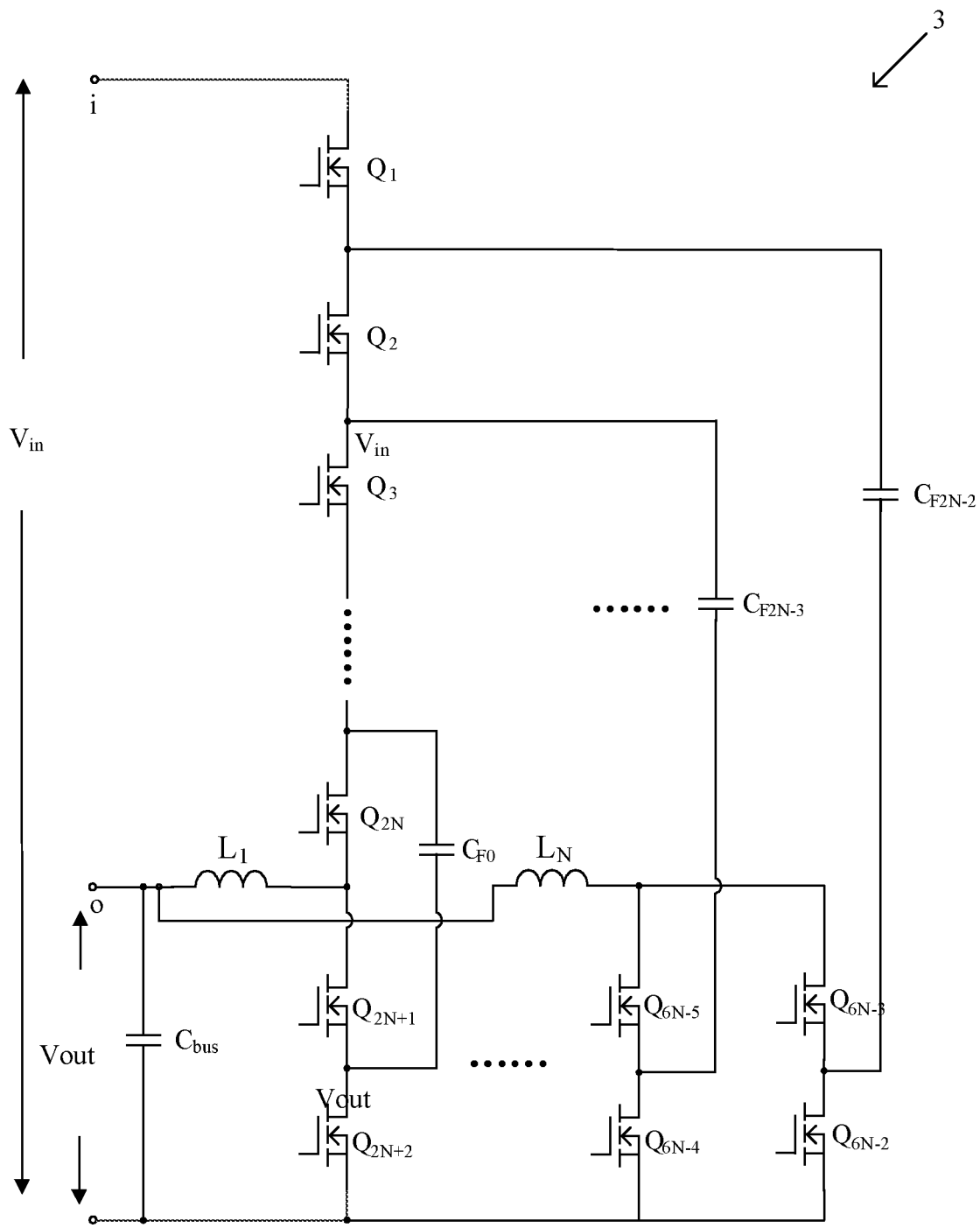
FIG. 9 is a schematic circuit diagram of a third example switched capacitor converter, in accordance with embodiments of the present invention.

Referring to FIG. 9, shown is a schematic circuit diagram of a third example switched capacitor converter, in accordance with embodiments of the present invention. In this particular example, a switched capacitor converter with N input switch groups is shown, where N≥2. For example, switched capacitor converter 3 can include N input switch groups, (2N−1) output switch groups, (2N−1) capacitors, and N inductors. N input switch groups can connect in series between input terminal i and output terminal o, where each input switch group can include two power switches connected in series, For example, the nth (1≤n≤N) input switch group can include power switches $Q_{2n-1}$ and $Q_{2n}$. Each output switch group can include two power switches connected in series, and the nth (1≤n≤2N−1) output switch group can include power switches $Q_{2N+2n-1}$ and $Q_{2N+2n}$. First terminals of (2N−1) capacitors may respectively be connected to the common nodes of every two series-connected power switches in the N input switch groups, and second terminals of (2N−1) capacitors may respectively be connected to the intermediate nodes of each output switch group. For example, the nth (1≤n≤2N−1) capacitor is $C_{F(n-1)}$.

When n is an odd number, the nth capacitor can connect between the intermediate node of the corresponding input switch group and the intermediate node of the corresponding output switch group. For example, the nth capacitor can connect between the intermediate node of the nth output switch group and the intermediate node of the [N−(n−1)/2]th input switch group. When n is an even number, the nth capacitor can connect between the common terminal of the two adjacent input switch group (that is, the common node of the two series-connected power switches of adjacent input switch groups) and the intermediate node of the corresponding output switch group, e.g., the nth capacitor is connected between the intermediate node of the nth output switch group and the common terminal of the [N−(n−2)/2]th input switch group and the [N−(n−2)/2−1]th input switch group, where the intermediate node is the common node of the two power switches connected in series in the switch group. Further, a first terminal of inductor $L_1$ can connect to a first terminal of the first output switch group, and first terminals of the other inductors are respectively connected to the first terminals of the corresponding two output switch groups of the multiple output switch groups. For example, the first terminal of the nth (2≤n≤N) inductor can connect to the first terminal of the (2n−2)th output switch group and the first terminal of the (2n−1)th output switch group at the same time. Second terminals of each inductor can connect to output terminal o. In addition, the second terminals of each output switch group are connected to the reference ground.

In particular embodiments, the power switches in the input switch group and the output switch group may be controlled such that the switched capacitor converter operates in different working stages. Also, each capacitor branch formed in each stage can include one of the N inductors, thereby reducing the peak current when the switched capacitor converter switches between the working stages. Further, each capacitor branch can include at least one capacitor.

Figure 10:
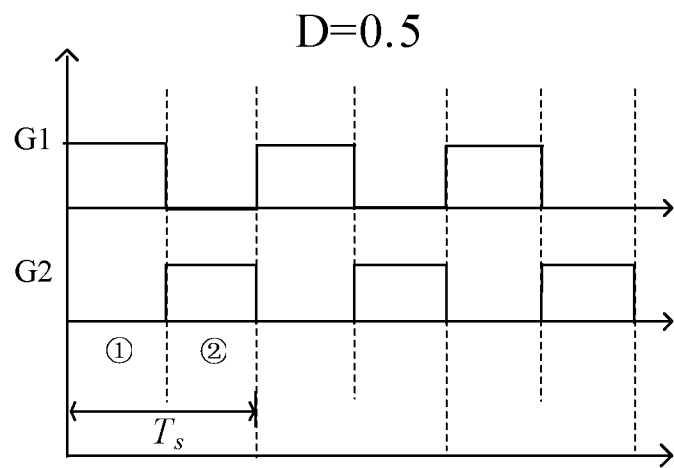
FIG. 10 is a timing diagram of example control signals for the third example switched capacitor converter, in accordance with embodiments of the present invention.

Referring now to FIG. 10, shown is a timing diagram of example control signals for the third example switched capacitor converter, in accordance with embodiments of the present invention. In this particular example, the switching states of each input switch group are the same, the switching state of the first output switch group is the same as that of each input switch group. The switching state of one of the two output switch groups connected to the same inductor can be the same as that of each input switch group, and the switching state of the other may be opposite to that of each input switch group. Also, the switching states of two adjacent output switch groups can be opposite. For example, the switching state of the nth output switch group (n is an odd number) is the same as that of each input switch group, and the switching state of the nth output switch group (n is an even number) is opposite to that of each input switch group. One of the two power switches in each input and output switch group in the switched capacitor converter is turned on and off according to control signal G1, and the other one of the two power switches in each input and output switch group is turned on and off according to control signal G2. Control signals G1 and G2 may have the same duty cycle and do not overlap each other. In this embodiment, in one switching cycle, control signals G1 and G2 can be complementary and have a duty ratio of 50%.

In one switching cycle, when control signal G1 is active, the switched capacitor converter operates in a first stage. When control signal G2 is active, the switched capacitor converter operates in a second stage. For example, power switches $Q_1, Q_3, \ldots, Q_{2N+1}, \ldots, Q_{6N-4}$ and $Q_{6N-3}$ can be turned on and off synchronously according to control signal G1, and power switches $Q_2, Q_4, \ldots, Q_{2N}, \ldots, Q_{6N-5}$, and $Q_{6N-2}$ may be turned on and off synchronously according to second control signal G2. In particular embodiments, the ratio of input voltage Vin to output voltage Vout of the switched capacitor converter can be 2N:1 under the above-mentioned control method.

Figure 11:
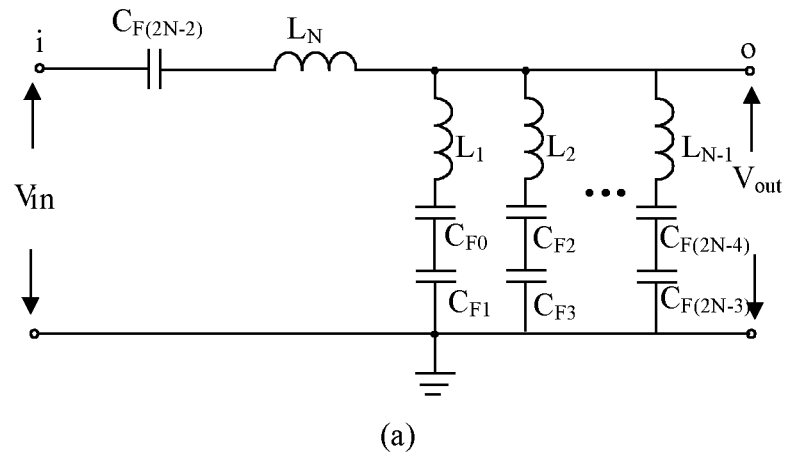
FIG. 11 is an equivalent circuit diagram of the third example switched capacitor converter, in accordance with embodiments of the present invention.
Figure 11:
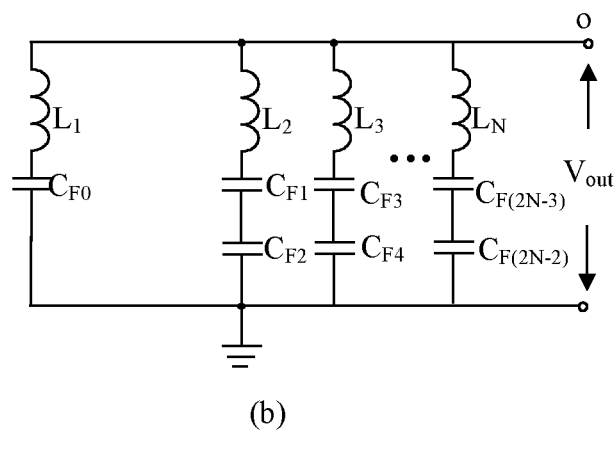

Referring now to FIG. 11, shown is an equivalent circuit diagram of the third example switched capacitor converter, in accordance with embodiments of the present invention. Diagram (a) of FIG. 11 shows an equivalent circuit diagram of the third example switched capacitor converter in the first stage. In the first stage, N capacitor branches may be formed. The nth(n<N) capacitor branch can include the nth inductor $L_n$, the (2n−1)th capacitor $C_{F[2(n-1)]}$, and the 2nth capacitor $C_{F[2(n-1)+1]}$ connected in series. The Nth capacitor branch can include the (2N−1)th capacitor $C_{F(2N-2)}$ and the Nth inductor $L_N$ connected in series. The first to (N−1)th capacitor branch can connect in parallel between output terminal o and the reference ground, and the Nth capacitor branch can connect between input terminal i and output terminal o.

Diagram (b) of FIG. 11 shows an equivalent circuit diagram of the third example switched capacitor converter in the second stage. In the second stage, N capacitor branches may be formed. Each capacitor branch can connect between output terminal o and the reference ground. The first capacitor branch can include inductor $L_1$ and capacitor $C_{F0}$ connected in series. The nth(n>1) capacitor branch can include the nth inductor, the (2n−2)th capacitor $C_{F[2(n-2)+1]}$, and the (2n−1)th capacitor $C_{F[2(n-2)+2]}$ connected in series.

In particular embodiments, when the switched capacitor converter operates in the first stage or the second stage, each capacitor branch formed in each stage can include an inductor, in order to reduce the current spike when the switched capacitor converter performs switching operations, thereby improving system efficiency.

In particular embodiments, the switched capacitor converter operates in a quasi-resonant state or a resonant state according to different inductances of the inductors. Further, the inductances of each inductor can be the same, and the capacitances of the capacitors connected to the common nodes of the adjacent input switch groups may be much larger than the capacitances of the capacitors connected to the intermediate node of each input switch group. Also, the capacitances of the capacitors having the first terminals connected to the intermediate nodes of the input switch groups can be the same. Therefore, in the first stage or the second stage, the capacitance and inductance of each capacitor branch may essentially be the same, such that the resonance center frequency remains unchanged in different working stages and each inductor current is the same. Accordingly, in the first stage and the second stage, each inductor can have the same equivalent operation state, and each inductor may bear a current with an average value of Iout/N.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switched capacitor converter, comprising:
   a) a plurality of input switch groups coupled in series between an input terminal and an output terminal, wherein each input switch group comprises two power switches connected in series;
   b) a plurality of output switch groups, wherein each output switch group comprises two power switches connected in series between a first terminal of a corresponding output switch group and a second terminal of the corresponding output switch group;
   c) a plurality of capacitors, wherein first terminals of the plurality of capacitors are respectively connected with common nodes of every two power switches connected in series in the plurality of input switch groups, and second terminals of the plurality of capacitors are respectively connected with intermediate nodes of each output switch group, wherein the intermediate node is a common node of two power switches in one same output switch group, and
   d) a plurality of inductors, wherein the first terminal of each output switch group is connected with a first terminal of a corresponding inductor, and second terminals of the plurality of inductors are connected with the output terminal, and second terminals of the plurality of output switch groups are connected to a reference ground.

2. The switched capacitor converter of claim 1, wherein each inductor has the same inductance.

3. The switched capacitor converter of claim 1, wherein the switched capacitor converter operates in a quasi-resonant state or a resonant state according to different inductances of the inductors.

4. The switched capacitor converter of claim 1, wherein a first terminal of a first inductor in the plurality of inductors is connected with a first terminal of a first output switch group, wherein the first terminal of the first output switch group is directly connected in series with the plurality of input switch groups, and each first terminal of other inductors is connected with first terminals of two corresponding output switch groups.

5. The switched capacitor converter of claim 4, wherein switching states of each of the plurality of input switch group are the same, and switching states of two adjacent output switch groups are opposite.

6. The switched capacitor converter of claim 5, wherein a switching state of the first output switch group is the same as that of the input switch group.

7. The switched capacitor converter of claim 5, wherein for the output switch groups other than the first output switch group, a switching state of one of the two output switch groups connected with the same inductor is the same as that of the input switch group, and a switching state of the other one of the two output switch groups connected with the same inductor is opposite to that of the input switch group.

8. The switched capacitor converter of claim 1, wherein when the number of the input switch groups is N, the number of the output switch groups is (2N−1), the number of the capacitors is N, and the number of the inductors is N, wherein N is an integer and N≥2.

9. The switched capacitor converter of claim 8, wherein a ratio of an input voltage to an output voltage of the switched capacitor converter is 2N:1.

10. The switched capacitor converter of claim 1, wherein power switches in each input switch group and each output switch group are controlled to be turned on and off such that the switched capacitor converter operates in different working stages, wherein each capacitor branch formed in each working stage comprises one of the plurality of inductors to reduce peak current when the switched capacitor converter switches between the working stages.

11. The switched capacitor converter of claim 10, wherein each capacitor branch comprises at least one of the plurality of capacitors.

12. The switched capacitor converter of claim 11, wherein when the switched capacitor converter operates in the first stage, N capacitor branches are formed, and a first capacitor branch to a (N−1) th capacitor branch are connected in parallel between the output terminal and the reference ground, and an Nth capacitor branch is connected between the input terminal and the output terminal, wherein each of the first capacitor branch to the (N−1) th capacitor branch comprises two capacitors, and the Nth capacitor branch comprises one capacitor, wherein N is the number of the input switch groups, and wherein N≥2.

13. The switched capacitor converter of claim 11, wherein when the switched capacitor converter operates in the second stage, N capacitor branches are formed, and a first capacitor branch to an Nth capacitor branch are all connected in parallel between the output terminal and the reference ground, wherein the first capacitor branch comprises one capacitor, and each of the second capacitor branch to the Nth capacitor branch comprises two capacitors, wherein N is the number of the input switch groups, and wherein N≥2.

14. The switched capacitor converter of claim 10, wherein one of the corresponding two power switches in each input and output switch group is turned on and off according to a first control signal, and the other one of the corresponding two power switches in each input and output switch group is turned on and off according to a second control signal.

15. The switched capacitor converter of claim 14, wherein in each switching cycle, the first control signal and the second control signal have a same duty cycle and do not overlap each other.

16. The switched capacitor converter of claim 14, wherein the first control signal and the second control signal are complementary and have a same duty cycle of 0.5.

17. The switched capacitor converter of claim 14, wherein in each switching cycle, when the first control signal is active, the switched capacitor converter operates in a first stage, when the second control signal is active, the switched capacitor converter operates in a second stage.

\* \* \* \* \*